United States Patent [19]

Papenburg et al.

[11] Patent Number: 5,505,805
[45] Date of Patent: Apr. 9, 1996

[54] METHOD FOR THE PRODUCTION OF REFLECTORS

[75] Inventors: Ulrich Papenburg, Lechbruck; Peter Goedtke; Ernst Blenninger, both of München, all of Germany

[73] Assignee: Industrieanlagen-Betriebsgesellschaft GmbH, Ottobrunn, Germany

[21] Appl. No.: 25,145

[22] Filed: Mar. 2, 1993

[30] Foreign Application Priority Data

Mar. 5, 1992 [DE] Germany .......................... 42 07 009.0
Jun. 23, 1992 [DE] Germany .......................... 42 20 472.0

[51] Int. Cl.$^6$ .................... B32B 31/06; B32B 31/12; B32B 31/26; G02B 5/08
[52] U.S. Cl. .................... 156/155; 156/60; 156/89; 156/306.6; 156/309.6; 427/191; 427/431; 359/838; 359/900
[58] Field of Search .................... 359/838, 850, 359/855; 427/167, 189, 430.1; 156/62.2, 89, 153, 154, 155, 309.6

[56] References Cited

U.S. PATENT DOCUMENTS

| | | | |
|---|---|---|---|
| 4,021,897 | 5/1977 | Fisli | 156/280 |
| 4,028,149 | 6/1977 | Deines et al. | 156/648 X |
| 4,100,330 | 7/1978 | Donley | 427/167 X |
| 4,315,970 | 2/1982 | McGee | 427/167 X |
| 4,444,467 | 4/1984 | Shuskus et al. | 427/142 X |
| 4,475,983 | 10/1984 | Bader et al. | 156/656 |
| 4,528,260 | 7/1985 | Kane | 156/647 X |
| 4,814,232 | 3/1989 | Bluege et al. | 359/900 X |
| 4,856,887 | 8/1989 | Wakugawa et al. | 350/641 |
| 5,075,257 | 12/1991 | Hawk et al. | 427/475 X |
| 5,160,560 | 11/1992 | Welkowsky et al. | 156/154 |
| 5,215,639 | 6/1993 | Boys | 156/242 X |

FOREIGN PATENT DOCUMENTS

| | | | |
|---|---|---|---|
| 0163200 | 12/1985 | European Pat. Off. | 359/838 |
| 0192271A2 | 2/1986 | European Pat. Off. | |
| 3246755A1 | 6/1984 | Germany . | |
| 3626780A1 | 2/1988 | Germany . | |
| 3819011A1 | 12/1988 | Germany . | |
| 3809921A1 | 10/1989 | Germany . | |
| 56-11402 | 2/1981 | Japan | 427/167 |
| 62-297800 | 12/1987 | Japan | 359/838 |
| 64-76000 | 3/1989 | Japan | 359/838 |
| 3-148601 | 6/1991 | Japan | 359/838 |
| WO88/04847 | 6/1988 | WIPO . | |
| WO90/01174 | 2/1990 | WIPO . | |

OTHER PUBLICATIONS

Naumann/Schroder: Bauelemente der Optik, 5th edition, p. 64, Hanser Verlag.
SiRA; ESTEC–Contract No. 5976/84/NL/PR; Oct. 1985.
W. Englisch, R. Takke, SPIE, vol. 1113, Reflective Optics II, 1989, pp. 190–194.

*Primary Examiner*—David A. Simmons
*Assistant Examiner*—M. Curtis Mayes
*Attorney, Agent, or Firm*—Marshall, O'Toole, Gerstein, Murray & Borun

[57] ABSTRACT

For the production of lightweight reflectors or mirror structures, metallic silicon of sufficient thickness is applied to a CFC or CMC substrate preform structure having the dimensions of the component to be produced by a heat treatment process, in particular at temperatures between 1300° C. and 1600° C. and in a vacuum or in a protective atmosphere. In this way, reflectors or mirror structures are formed directly. It is possible to work at temperatures of 300°–600° C. when the silicon is applied in the form of wafers which are joined to the substrate preform by way a zone of a melt eutectic incorporating a nonferrous metal. Preferably the nonferrous metal is gold.

17 Claims, 8 Drawing Sheets

METHOD FOR THE PRODUCTION OF REFLECTORS

FIELD OF THE INVENTION

The present invention relates to a method of producing reflectors or mirrors and to a reflector or mirror made according to the method.

DESCRIPTION OF THE PRIOR ART

Many optical materials are used for the orderly transmission of rays by refraction or reflection, and both properties can be employed simultaneously. Materials that function by refraction are mainly characterized by the wavelength-dependence of their refractive index and of their transmittance.

In the case of mirrors and reflectors, the feature of interest is the reflectance as a function of wavelength. A metal layer of adequate thickness will absorb the rays that are not reflected. With dielectric mirrors, which can be made nearly absorption-free, a crucial factor is their ability to resist atmospheric influences and the degree to which it can be increased by protective coatings.

Whereas a large number of highly transparent glasses are available for the visible region of the spectrum, this is not the case in the UV and IR regions. Here the glasses are supplemented by a small number of crystals and materials derived therefrom, the most important property of which is high transmittance. Some of these materials (e.g. $BaF_2$, $CaF_2$, $LiF$, $Al_2O_3$, $SiO_2$) are suitable for broad-band and multispectral systems, because they are transparent from the UV to the IR. A disadvantage of some of these materials is their high solubility in water, so that protective coatings must be applied and/or the mirrors can be used only in completely dry air.

Monocrystals (isotropic or anisotropic, depending on the kind of crystal) are obtained from natural deposits or cultured artificially (pulled from a molten mass). Polycrystalline material (isotropic) is produced by pressure sintering.

For most applications only isotropic materials are appropriate. Anisotropic crystals are used in polarization optics.

The semiconductor silicon, which is isotropic, acts as a long-pass filter with sharp cutoff, thus separating the visible from the near IR range. Polycrystalline silicon as normally employed, with a thickness of 2 mm (not treated to reduce reflection), has a transmittance $\tau$ of ca. 0.53. As wavelength increases, transmittance goes through a minimum at about 16 μmm and then increases again, until it reaches 0.4–0.5 in the range above 300 μmm. It is this property, in combination with its favorable thermal characteristics, that enables silicon to be used primarily in infrared optics and as a mirror substrate despite its brittleness. (Source 1: Naumann/Schröder: Bauelemente der Optik, 5th edition, p. 64, Hanser Verlag)

Surface mirrors offer many advantages over refractive systems, due to their achromatic imaging and the avoidance of other errors associated with passage through refractive materials. However, because the change in the deflection angle of a ray is twice as large as the change in angle of incidence, for given optical requirements mirror surfaces must meet stricter criteria than refractive interfaces with respect to accuracy of shape and microstructure. Another characteristic of a mirror is the shape of its spectral reflectivity curve. Although it is possible to polish the surface of a massive metal body so well that it can be used as a mirror directly, this method is used today only in exceptional cases. In general a mirror layer is applied to a mirror substrate. The metallic mirror substrate is previously polished and is responsible for the accuracy of the mirror's surface configuration. The mirror layer is applied to the substrate usually by sputtering in high vacuum or by chemical methods. The mirror layer then matches exactly the shape of the substrate surface and determines the spectral reflectance function and, in some cases together with protective layers, the temporal stability of the reflectance function. The preferred materials for mirror layers are metals such as aluminum, chromium, nickel, mercury, silver, gold, platinum and rhodium, but silicon monoxide (SiO) and silicon dioxide ($SiO_2$) are also used (Source 1).

The materials used for mirror substrates and reflectors must have a high degree of mechanical and thermal stability. Large mirrors become deformed due to their own weight when their position changes; displacements by fractions of $\lambda$ must be prevented or compensated by opposing forces. Temperature changes and nonuniform temperature distributions induce internal tensions and deformations. Hence crucial requirements for a substrate material for precision mirrors are a high modulus of elasticity E and a very low coefficient of thermal expansion $\alpha$. Furthermore, the material must be polishable to an optimally smooth surface with a very low proportion of scattered light.

In this respect most metal surfaces are unfavorable, because their internal texture is such that inhomogeneous properties at the grain boundaries can produce surface inhomogeneities after polishing. Nevertheless several metals are used as mirrors, including pure copper, aluminum and molybdenum alloys and pressure-sintered beryllium, though it is necessary to improve their polishability with a layer of chemically deposited nickel phosphide. Metallic mirrors have high thermal expansion, but because of their favorable thermal conductivity they do find limited application, e.g. for high-performance lasers. At present glass and vitreous ceramics are of greater significance.

Certain structural components, especially for aerospace applications, are also required to have high mechanical and thermal stability combined with a low relative weight. Furthermore, good resistance to thermal shock must be accompanied by a low thermal expansion coefficient.

For example, future satellites are to be equipped with a mirror structure that rotates when in use. These mirrors will be large, for instance measuring 800×600 mm, and on the front side must have an optically reflecting surface.

Apparatus used in outer space can be expected to encounter cyclic temperature changes from 0 to 700 K, so that in addition to rigidity appropriate to their size they must be guaranteed to have thermal and thermal-shock resistance, a low weight per unit volume and, not least, low thermal expansion. The groups of materials that meet these criteria must also have surface properties of the quality required for reflecting optics.

Conventional mirror components at present are made of vitreous ceramic. The manufacturing process involves the melting of various oxide powders, such as $LiO_2$, $Al_2O_3$, $MgO$, $ZnO$ and $P_2O_5$, in platinum furnaces. After the melt has been homogenized, objects of the desired shapes are produced by pressing, casting and other glass-forming processes. The glass components are then suddenly cooled and removed from the molds, and subsequently tempered in a controlled manner to temperatures of ca. 700° C.; in this process crystal "seeds" form in noncrystalline (amorphous) glass. If the specified temperature is maintained for a suitable time, this seed formation leads to crystal growth and completes the "ceramization" of the glass, producing a vitreous ceramic.

This crystalline vitreous ceramic possesses the advantage of low thermal expansion, only $0\pm0.15\times10^{-6}$ K$^{-1}$ over the temperature range from 273 K to 323 K.

As a material for mirrors, however, this vitreous ceramic is of limited use, because it can be produced only by elaborate shaping procedures and furthermore has a relatively high weight per unit volume, 2.53 g/cm$^3$, as well as low tensile strength and not least a brittle breaking characteristic. In addition, it can be employed for optical components only at a constant or maximal temperature of 423 K, because the crystalline structure of such vitreous ceramics is subject to tension hysteresis in the temperature ranges 200–300 K and 360–480 K. At temperatures above 700 K the internal structure of the material is irreversibly damaged (Source 2: SiRA; ESTEC-Contract No. 5976/84/NL/PR; October 1985).

Attempts have also been made to manufacture lightweight mirror components from economically favorable aluminum (relative weight 2.71 g/cm$^3$). However, because of the low stiffness of aluminum it has been impossible so far to construct precision optics of this material. For use in corrosive surroundings, aluminum mirrors must be provided with a thick (0.2–0.5 mm) coating of nickel. Because of the massive differences in thermal expansion between aluminum ($23\times10^{-6}$ K$^{-1}$) and nickel ($13\times10^{-6}$ K$^{-1}$), these mirrors must not be exposed to any temperature fluctuations, which would cause thermally induced fracture.

Mirrors of pure aluminum, such as can be employed in a vacuum, exhibit local deformation under even slight thermal stress, due to the extremely high thermal expansion coefficients on the optical mirror surfaces. When they are used, e.g., as laser mirrors for distance measurement, such deformation can led to undefined results (Source 2).

Reflecting optics based on quartz glass are also state of the art. Because of their extremely low thermal expansion coefficients, nearly zero in the temperature range from 0 to 273 K, quartz-glass systems are eminently suitable for so-called cryogenic applications. In the range between 273 K and 373 K their thermal expansion coefficient rises to $5.1\times10^{-7}$ K$^{-1}$. Other disadvantages are the relatively high weight per unit volume, 2.2 g/cm$^3$, the low rigidity, the low tensile strength of <50 MPa, high production costs and the restriction of the diameter to ca. 500 mm because of the complicated manufacturing process (Source: W. Englisch, R. Takke, SPIE, Vol. 1113, Reflective Optics II, 1989, pages 190–194).

Its mechanical and thermal characteristics and its low relative volume, only 1.85 g/cm$^3$, make beryllium especially suitable for the manufacture of lightweight mirror structures. For example, beryllium is five times more rigid than aluminum or glass materials. Coated beryllium plates can be polished to a surface roughness (Ra) of less than 15 Ångström, so that they are very well suited for optically reflecting surfaces.

A particular disadvantage of berylium structures, in addition to the high cost of the raw material and of the manufacturing process, is their general toxicity. To use them as optical components under atmospheric conditions, they must first be coated with nickel. Because of the different thermal expansion coefficients of beryllium ($11.2\times10^{-6}$ K$^{-1}$) and nickel ($15\times10^{-6}$ K$^{-1}$), it is essential for these components to avoid thermal shock. Therefore they can be employed only at constant temperatures or in very narrow temperature ranges.

It has also been discovered that beryllium components manufactured by the vacuum hot-pressing technique or by high-temperature isostatic pressing have an anisotropic character, such that they have different properties in different crystal directions.

Under outer-space conditions, uncoated mirrors can be used. However, because of the high thermal expansion coefficient the temperature fluctuations typically encountered there, between 0 and 700 K, produce local deformations of the optical surface that make beryllium unusable for precision optics (Source 1) and can also introduce serious transmission problems in the case of satellite mirrors.

Mirror structures of this kind are currently also constructed of monolithic ceramic based on silicon carbide, by the so-called slip casting technique. In this casting process, a suspension of silicon-carbide powder is placed in a plaster mold shaped as a negative. Depending on the time the suspension spends in the plaster mold, a ceramic body with variable wall thickness forms; this is the positive component in the green state. After the blanks have dried, a sintering process is carried out in vacuum or protective-atmosphere furnaces at temperatures as high as 2200° C. This manufacturing technology not only requires the construction of elaborate molds to produce the green compacts, it also has the disadvantage that only certain geometries and small sizes are achievable, and the entire process suffers from a high percentage of rejects. Because these formed silicon carbide bodies shrink during drying and sintering, the required accuracy of their dimensions can be ensured only by expensive machining with diamond tools. Furthermore, the heterogeneous texture of the sintered compact makes it necessary for the compact to be coated with silicon carbide by chemical vapor deposition, to reduce the surface roughness to less than 40 Ångström. Not only does silicon carbide require these elaborate manufacturing and machining processes, it also has a relatively high weight of 3.2 g/cm$^3$ and is extremely brittle.

From German Patent Specification 32 46 755 A1 it is known that highly stable, lightweight composite materials can be constructed of various laminate layers combined with cellular or honeycomb layers. Among the raw materials used are fibrous mats soaked with artificial resin, webs of paper, plastic, foil or glass, carbon-fiber mats or polyimide. The cellular or honeycomb layer is intended to endow the formed object with better stability and increased resistance to bending.

Such bonded materials based on carbon- or glass-fiber reinforced plastics are restricted to room-temperature applications. The inhomogeneous structure of the fibrous or laminated components makes it impossible for an optical mirror surface to be created by superficial processing.

SUMMARY OF THE INVENTION

The object of the present invention is to provide a method for the production of a lightweight reflector or mirror, which has improved mechanical/thermal properties over those of the prior art and which overcomes or substantially reduces the complexity of the prior art methods.

According to the present invention there is provided a method for the production of a reflector or a mirror for the reflection of electromagnetic waves, comprising the steps of producing a preform from a material resistant to high temperatures to define a substrate structure for the reflector or mirror, and applying an outer layer of metallic silicon by a heat treatment to at least one surface of the substrate structure to define a surface capable of reflecting electromagnetic waves in a defined direction.

Preferably, said heat treatment comprises either a melting-on heat treatment or sinter-fusion.

Preferably also, the substrate preform comprises either a carbon-fiber composite (CFC) or a ceramic matrix composite (CMC).

BRIEF DESCRIPTION OF THE DRAWINGS

These and other aspects of the present invention will be more fully described in the following detailed description and in the specific examples of preferred embodiments which are described with reference to the drawings wherein.

DESCRIPTION OF THE PREFERRED EMBODIMENTS

In the following description, the use of carbon or carbon fibers is described as the basic material for construction of preforms for the reflectors. At this juncture, however, it should be stated expressly that the materials with similar fine-structural characteristics can also be used within the ambit of this invention. Any suitable material that can be "impregnated" in order to permit firm fixation of a silicon reflector layer onto the core structure can be used.

Furthermore, it should be pointed out that the following description refers in general to the use of preforms or wafers made of silicon for construction of the outer layer. It is also possible to use metallic silicon in granular or powder form, in which case subsequent mechanical processing such as grinding and/or polishing will be required. However, the method is especially simple when it employs wafers, which provide adequately reflective surfaces without further processing.

CFC composites consisting of a carbon matrix with carbon-fiber reinforcement are produced industrially by the resin-impregnation and carbonization method. The resulting materials are distinguished by an extraordinarily favorable combination of characteristics, such as high mechanical stability in space and at high temperatures, combined with low weight per unit volume (1.0–1.7 g/cm$^3$) and low brittleness.

Set against the excellent material characteristics of CFC is its low resistance to oxidation, which greatly limits the possibilities for employing the material in an oxygen-containing atmosphere. At present its low resistance to oxidation restricts CFC to use in vacuum and protective atmospheres, because otherwise at temperatures above 400° C. it begins to burn away.

To increase the oxidation resistance of this material, the so-called ceramic matrix composites (CMC) were developed. Here refractory and ceramic components are infiltrated into the porous CFC matrix. It is also possible to manufacture short-fiber formed elements, in which short carbon-based fibers are dissolved in a phenolic-resin suspension and harden when the temperature is increased. When the temperature is further increased in the absence of oxygen, the resin binders of the two composite qualities are carbonized.

A reflector made in accordance with the present invention has as its basic structural element fiber-reinforced CFC or CMC or carbon-honeycomb composites plus superficial metallic silicon. Here metallic silicon is understood to mean elementary silicon that has been applied to CFC carrier substrates as silicon preforms or wafers or silicon powder, by processes of diffusion, sintering or melting-on. Silicon wafers are thin metallic pieces consisting of highest-purity silicon. The silicon can have an isotropic or polycrystalline structure.

The invention enables the manufacture of components with complex geometry, high temperature-shock resistance, low relative weight (0.5–2 g/cm$^3$) and simultaneously high tensile strength (>150 MPa), low thermal expansion coefficient and surfaces suitable for reflecting optics.

Another advantage of the method in accordance with the invention is that economically priced, commercially available material can be used, which can be processed with any machine tools.

Furthermore, the density and strength of the component can be adjusted as desired, by suitable choice of substrate structures and of the quantity or quality of the infiltration processes. The thermal expansion coefficients of the groups of materials used in accordance with the invention closely resemble one another, resulting in very precise elements of stable form even when the dimensions are large.

Any CFC raw materials can be used advantageously, in particular those based on long or short fibers and with oriented or unoriented fiber structure. Moreover, the method in accordance with the invention can also be applied to known honeycomb structures based on paper, cellulose or carbon fiber.

The density of the CFC block is at most 1.4 g/cm$^3$; that is, it has high porosity. Apart from the pores, the block body contains no cavities, so that with respect to its shape it is a massive body such as a plate, a brick or a solid cylinder. For multidimensionally oriented CFC qualities with long-fiber construction, as a rule, one begins with resin-impregnated carbon-fiber webs, so-called prepregs, which are compressed into CFC plates in heatable axial presses.

To produce CFC blocks on a short-fiber basis, carbon or graphite fibers are suspended in a thermosetting resin binder, as known in the art. The suspension is poured into a mold and then the solvent is removed, e.g. by heating, and the resin binder and hence the CFC block is hardened. In all CFC qualities the fiber reinforcement is intended to counteract embrittlement of the ceramized CFC material and maintain quasiductile fracture behavior. The honeycomb structures manufactured by the known molding methods, e.g. from hard paper or carbon fibers, are treated to increase the carbon yield by impregnation with a resin binder, preferably phenolic resin, and hardened by subsequent heat treatment.

The next step is common to all CFC or honeycomb structures: carbonization of the binder resin in vacuum or protective atmosphere at temperatures of, e.g., 900°–1300° C. The CFC block or honeycomb structures so obtained are then preferably heated in vacuum or protective atmosphere to temperatures of more than 2000° C., to achieve at least a partial graphitizing of the carbon matrix and fibers.

The block is then machined down to produce the CFC blank, which has the dimensions of the component to be manufactured, such as the basic mirror structure of a satellite or other optically reflecting system. The removal of material in this process can be done, for example, by turning, milling or grinding, with the same machines as are ordinarily used for the machining of metallic materials. To achieve further weight savings, during the machining of the CFC blanks pockets of any desired geometry can advantageously be milled, eroded or drilled into the back surface of the mirror structures. After carbonization the carbon honeycomb structures can be laminated to form a composite by attaching to the front surface carbon-fiber webs of any kind or web prepregs, by means of a resin binder. Furthermore, it is possible to press the honeycomb structures into the highly porous short-fiber CFC or to construct a sandwich system by pressing together several honeycomb structures, each encased in a CFC web. In this way, after carbonization a highly thermostable, lightweight construction material is obtained, with great rigidity and quasiductile fracture behavior.

The CFC or honeycomb blank obtained after machining, which like the block has a low density of $0.1–1.3$ g/cm$^3$ and hence a high porosity, up to 90 vol. %, can subsequently be further infiltrated and stabilized by impregnating it with resin binders and carbonizing them.

Another way to achieve the necessary strengthening of the CFC blanks and thereby increase the rigidity of the basic mirror structure is by infiltration with pyrolytic carbon by chemical vapor deposition, until the density reaches a maximum of 1.4 g/cm$^3$ but preferably $0.3–1.0$ g/cm$^3$. Whereas in resin impregnation phenolic resins are preferred, in the chemical vapor deposition of carbon it is preferable to use a mixture of hydrocarbons, such as methane or propane, and an inert gas, such as argon or nitrogen, at a temperature between 700° and 1100° C. and a pressure of 1–100 millibar. The gas mixture diffuses into the porous structure and breaks down to form carbon and hydrogen, the carbon preferably being deposited as pyrolytic carbon on the surfaces or at the intersection points of the fibers and thereby strengthening the structure.

The CFC blanks obtained from either infiltration process are polished on the surfaces intended for reflection and fitted into a vacuum or protective-atmosphere furnace. One or several metallic silicon preforms are laid onto the polished side and the sample is heated to temperatures of 1300°–1600° C., preferably 1350°–1450° C. As the result of a chemical reaction between the carbon and the silicon, silicon carbide forms at the interfaces, creating a consolidation or joint and thereby attaching the silicon wafer to the the CFC substrate. In addition to the chemical reaction, melting-on of the metallic silicon and diffusion can also cause the wafer to become attached to the CFC blank, forming optically reflecting structures.

Metallic silicon wafers can be fixed to so-called ceramic-matrix composites (CMC), which for example contain silicon carbide and silicon in the matrix, at temperatures of 1300°–1600° C.

An especially advantageous version of the method in accordance with the invention also provides for the surfaces that are to be made reflective to be covered with one or more silicon preforms or silicon wafers and for the substrate thus prepared to be positioned with its lower end in a pool of molten doped silicon. Due to the capillary forces in the substrate structure, the molten silicon ascends in the blank until it reaches the preforms of high-purity silicon on its upper surface. Firstly, the blank is thereby upgraded to a CMC and the silicon preforms or wafers resting on it are joined to one another and fixed by their back surfaces to the substrate. In addition, substrate structures consisting of several discrete elements assembled by mechanical means can be consolidated into a single unit by the ascending silicon.

The amount of molten metallic silicon used to infiltrate the CFC blank should be such that the density of the latter is less than 2.0 g/cm$^3$, preferably 1.5–1.8 g/cm$^3$. It is advantageous for the commercially available metallic silicon-monocrystal wafers to have been pre-ground and polished in such a way that after application to the substrate they immediately form optically reflecting surfaces, so that machining cycles can be reduced to a minimum or eliminated altogether. To prevent massive melting-on, deformation and volatilization of the applied silicon elements, a maximal process temperature of 1550° C. must not be exceeded; the process temperature is preferably between 1350° and 1500° C. In a particularly advantageous version of the method in accordance with the invention, the silicon preforms are glued to the CFC or CMC or honeycomb substrate prior to fixation by means of adhesive or resin binder, which during the subsequent heat treatment facilitates the processes of diffusion, sintering or melting-on at the interface between the substrate and the silicon preforms.

As adhesives or resin binders it is advantageous to use precursors based on polysilane or silicon carbonitride and/or adhesives based on silicon, silicon carbide or carbon or silicones. Before the reactive fixation process the adhesives must be dried or hardened at temperatures between 100° and 200° C. Pyrolysis of the resin binders is carried out at 1000° C. in vacuum or in a protective atmosphere.

Polysilanes (polymethylphenylsilanes), for example, after pyrolysis under inert gas at 1200° C. give a ceramic solid yield of 30% to maximally 70% by weight, depending on the solvent.

For mirror and reflector applications in the temperature range of, for example, 250 and 330 K with no major temperature fluctuations, a sufficiently firm attachment between the substrate and the mirror layer can be achieved by gluing the silicon parts to the substrate structures with silicones.

Glass frits can also be used, with suitable tempering above 600° C., to fix the silicon preforms to the CFC or CMC substrates by melting-on processes.

The method in accordance with the invention further provides for several silicon preforms or Si wafers differing in doping or melting points to be applied as so-called multilayers to the CFC or CMC or honeycomb substrate structures, the silicon preforms preferably being arranged in such a way that the one with the lowest melting point is placed directly on the substrate and all the silicon preforms arranged above it have a higher melting point. Undoped highest-purity silicon, for example, has a melting point at 1412° C. Depending on the amount of impurities in silicon (doping), the melting point can be lowered by various amounts due to the formation of eutectics.

The components so produced can then undergo a further finishing process, for example to produce optically reflecting surfaces in the case of a satellite mirror. For finishing, the grinding, lapping and polishing machines and tools ordinarily used in metalwork can be employed, in particular diamond tools.

If the reflecting/mirroring surface consists of wafers, then the temperature for the melting-on process is made such that the smooth outer surface of the wafer does not melt. In the case of silicon preforms with non-smooth surfaces, or when Si powder is used, the reflecting surface is first created by solidification of the melt and is subsequently ground smooth and polished.

In another version in accordance with the invention, the silicon preforms applied to the CFC or CMC substrate, and wherein the substrate contains between 5% and 50% inclusive by weight unconverted metallic silicon, can be converted at least superficially to hard silicon carbide (SIC). Especially for the fields of application in which chemical attack or abrasion is likely to occur, the mirrors or reflectors with their silicon-mirror layer can be exposed to a carbon-containing atmosphere above 700° C., whereupon the silicon reacts with the carbon and forms a silicon carbide surface layer that is resistant to wear. For example, at temperatures of 1200°–1300° C. the silicon reacts with a gas mixture consisting of methane and argon or hydrogen to form silicon carbide. In the temperature range 900°–1200° C. a gas mixture comprising $C_2H_8$ and $H_2$ also leads to formation of silicon carbide.

Silicon mirror surfaces on CFC or CMC substrates can be produced not only by application of silicon preforms but also, in accordance with the invention, by applying silicon powder to the substrate. Here metallic silicon powder is scattered onto the surface of the CFC or CMC substrate to be made reflective and melted in vacuum or in a protective atmosphere at temperatures above 1000° C., preferably 1300°–1600° C. After cooling, the mirror or reflector structures of CFC or CMC bear a continuous superficial silicon layer, which can be made into a mirroring or reflecting surface by a polishing process.

A further advantageous version of the method in accordance with the invention provides for the silicon mirror layers on the CFC or CMC substrates to be converted superficially into silicon dioxide ($SiO_2$) or quartz, for applications such as in a broad-band or multispectral system. For this purpose the whole mirror or reflector structure or other optical components with their reflective silicon surfaces are exposed to an oxygen-containing atmosphere, preferably air, at temperatures above 500° C., preferably 800°–1000° C., so that the metallic silicon is superficially oxidized to silicon dioxide ($SiO_2$).

Another aspect of the developed method is that to manufacture especially complex mirror or reflector systems or other optical components based on a CFC or CMC substrate, the mirroring or reflecting silicon surfaces are joined by high-temperature isostatic pressing (HIP) to form a composite material with continuous surface fixation. The technology of high-temperature isostatic pressing is based on the combined, simultaneous application of pressure and heat to the mirror components. The pressure is exerted on all sides of the reflector structure by way of a gas and can reach 2000 bar. Because of the all-round gas pressure, there are no restrictions on the geometry of the mirrors and reflectors. However, care must be taken that no gas penetrates into the silicon layers coupled to the CFC or CMC substrates and hinders joining at the interfaces. Therefore the mirror structures are, for example, enclosed in steel containers prior to high-temperature isostatic pressing, so that the surfaces to be joined are sealed off from the gas pressing on them from outside. The temperature during silicon mirroring of the CFC or CMC substrates is below the melting point of silicon. The HIP process is carried out below 1412° C., preferably at 1100°–1412° C. A diffusion bond between the superficial silicon layer and the CFC or CMC substrate is produced. The all-round gas pressure accompanied by uniform heat distribution in the object guarantees a homogeneous and thorough joining of the surfaces, even in complex structures.

Here, just as in the previously described pressureless application of silicon preforms to CFC or CMC, by sintering under pressure the Si mirror layer and the substrate components are pressed into one another and form indissoluble anchorings, interlockings and undercuttings.

Here, again, silicon preforms or wafers, in any geometry or chemical composition, as well as silicon powder can be used advantageously to produce the mirroring or reflecting silicon surfaces.

Fixation of the silicon preforms to the substrate structures is made possible at considerably lower process temperatures (so that in the case of certain applications, it is possible to work in a normal atmosphere, without protective gas or vacuum) by coating the silicon preforms with gold before they are attached to the substrate structure. In the temperature range 350°–400° C. silicon forms a plastically deformable melt eutectic with gold. As a result, it is possible to attach the silicon preform, e.g. wafer, to the substrate structure by melting-on at temperatures of 300°–600° C. If desired, the melt eutectic of metallic silicon with a nonferrous metal may be produced in a separate heating process, which is independent of the process of melting onto the substrate structure.

Gold offers the advantage that its thermal expansion coefficient is similar to that of silicon, so that there is no danger of thermal damage as a result of temperature fluctuations. Another advantage of gold is that, because of its chemical inertness, it reacts only with silicon. As a result, in the limiting case gold-coated silicon preforms can be melted onto the substrate structures in a normal atmosphere in the low temperature range of ca. 300°–450° C., which considerably reduces the cost in comparison to melting-on in a protective atmosphere or in vacuum. Where the contact between the silicon preform and the substrate structure must be of very high quality, however, sintering in vacuum is preferable.

The silicon preforms can be coated with gold, e.g., by applying gold foil or by physical vapor deposition (sputtering), and the thickness of the coating should be about in the range 0.5–50 μmm. In principle the gold layer can be applied to the surface of the substrate that is to be made reflective, rather than to the silicon preform.

Instead of gold it is also possible in principle to use other nonferrous metals or materials that form a plastically deformable melt eutectic with silicon. An example is aluminum, which forms a melt eutectic with silicon in the temperature range ca. 500°–650° C. However, because aluminum can oxidize to form an Al2O3 layer which would inhibit sintering, it must be applied under vacuum or in a protective atmosphere. Furthermore, aluminum has a higher thermal expansion coefficient than silicon, which limits its use for applications involving marked temperature fluctuations.

The choice of a coating material in any individual case will depend on the conditions of use, quality considerations and the costs of materials and manufacturing processes.

Several examples of methods according to the invention will now be described with reference to the drawings.

EXAMPLE 1

40 carbon-fiber web prepregs with sateen weave, a phenolic-resin component amounting to 35% by weight and a diameter of 150 mm are compressed for 8 minutes in a heatable axial press at a temperature of 200° C., producing a CFC preform with a diameter of 150 mm and a wall thickness of 12 mm. The object produced by the forming process, for example this disk, is then carbonized in a reactor with oxygen excluded, i.e. in vacuum or a protective atmosphere, at ca. 1000° C. To minimize the reactivity of the carbon fibers and/or to influence the modulus of elasticity, the block is exposed to a temperature of more than 2000° C. in the absence of oxygen, i.e. in vacuum or a protective atmosphere, as a result of which the matrix carbon formed by carbonization of the phenolic resin is at least partially graphitized. This graphitization is produced, for example, by heating at a rate of 30 K/min and holding for 2 hours at 2100° C. The CFC block thus obtained has a thickness of 1.0 g/cm$^3$.

Figure 6A:
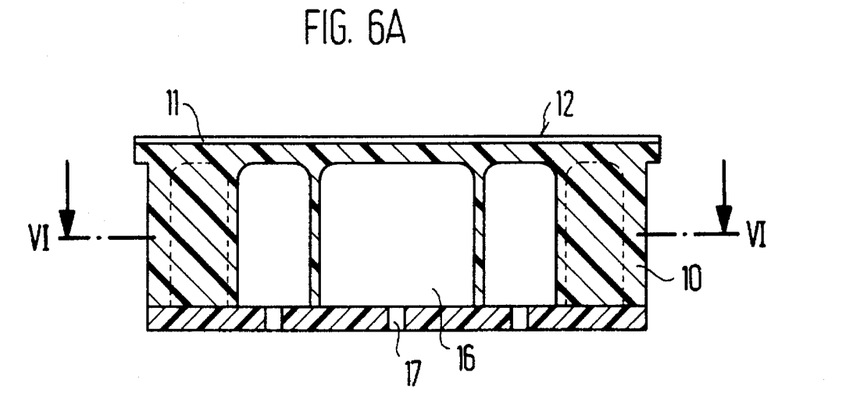
FIG. 6A is a longitudinal section through a preferred embodiment of a substrate preform.
Figure 6B:
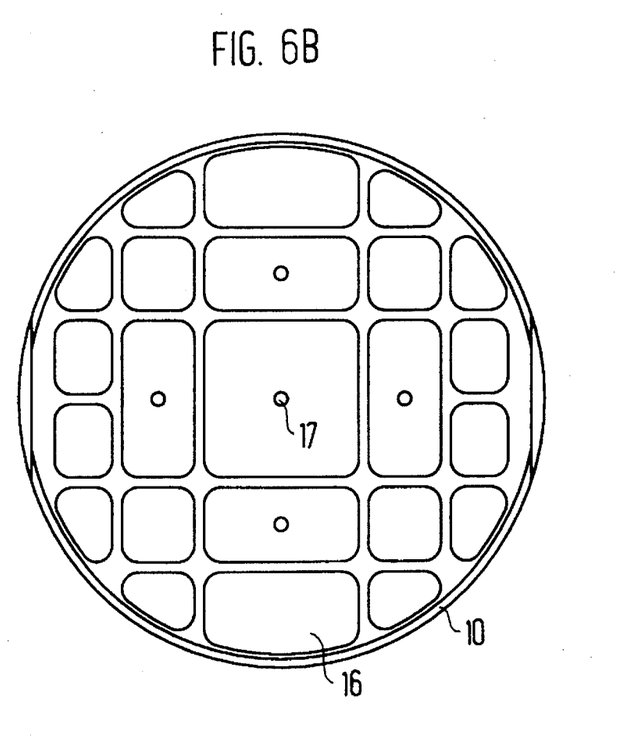
FIG. 6B is a section along the line VI—VI in FIG. 6A.

The block is then machined by turning, milling or grinding to produce the blank shown in FIG. 6, which serves as the substrate for optically reflecting mirror structures.

The blank is again impregnated with phenolic resin, in a pressure autoclave at 500 bar. After the pressure impregnation, a preform made of metallic silicon (diameter 123 mm, wall thickness 0.8 mm) is stuck to the component. As the adhesive, for example, a commercially available silicon carbide adhesive of type known as RTS 7700 made by the firm of Kager is used, which dries at 100° C. in air without shrinking. The impregnated component is carbonized anew in a reactor at 1000° C. and a pressure of 10 mbar. The rate of heating is 2 kelvin per minute, and the holding time is 12 hours.

The blank with attached silicon preform and a density of 1.18 g/cm$^3$ is now heated in a vacuum furnace at a rate of 20 K per minute to a temperature of 1390° C. and held there for 30 minutes. After it has cooled to room temperature, the silicon disk is firmly interlocked with the CFC, without deformation.

Microscopic examination of the surface of a section through a reference component confirmed that the silicon preform was joined to the CFC substrate by firm interlocking with no discernible fissures and pores. Polishing trials employing submicron diamond suspensions showed that the silicon surface can be polished with no difficulty so as to reduce the surface roughness Ra to less than 15 Ångström, so that it is eminently suitable for optically reflecting structures.

EXAMPLE 2

Short carbon fibers, 10–30 mm in length, are reduced to a slurry in a phenolic-resin suspension. The fiber content of the suspension is 40% by weight. The suspension is poured into a cylindrical mold with a diameter of 150 mm and a height of 100 mm. The solvents contained in the phenolic resin are removed at 60°–70° C. in vacuum. When the temperature is raised to 180° C., the phenolic resin hardens. After removal from the mold, the cylindrical CFC block is carbonized in the absence of oxygen, as in Example 1.

The CFC block so obtained, with a quasi-isotropic internal structure, has a density of 0.55 g/cm$^3$ and a porosity of about 70 vol. %. To minimize the reactivity of the carbon fibers and/or to convert the matrix carbon formed from the phenolic resin at least partially to graphite, graphitization is carried out at temperatures of more than 2000° C., as described in Example 1.

From the cylindrical block the components illustrated in FIG. 6, which can serve as substrates for the satellite mirror structures, are produced by machining in a lathe, milling machine and/or polisher.

The components are infiltrated with pyrolytic carbon by chemical vapor deposition. This process is carried out in a vacuum furnace for 50 hours at 750° C., with a partial pressure of 2 mbar, the gas phase comprising propane and argon in the ratio 1:5. When it has been completed, the density of the components is 0.90 g/cm$^3$ and their open porosity has been reduced to ca. 30%.

Now the components are placed in a high-temperature vacuum chamber in a graphite vessel, the floor of which is covered with molten metallic silicon. The molten silicon rises within the blank by capillary action, filling its pores almost entirely with silicon. When the temperature is raised further, to about 1750°–1800° C., some of the metallic silicon is converted to silicon carbide by combination with pyrolytic carbon.

After cooling to room temperature, the component has a density of 1.75 g/cm$^3$, 20% of the matrix being composed of unreacted, free metallic silicon.

The resulting ceramic-matrix-composite (CMC) component 10, with recesses 16 and drilled holes 17, is now polished with a polishing machine on its front side, the side intended for the mirror surface. A silicon preform 11 with a diameter of 123 mm and a wall thickness of 1.0 mm is laid onto the polished surface, with no application of adhesives or resin binders, and the structure is fitted into a protective-atmosphere furnace. In an argon atmosphere the component is heated to 1405° C. at a rate of 30 K/min. After a holding time of 20 minutes the structures are cooled to room temperature.

To check the fixation or joining of the silicon parts, a component was sawn apart and the cut surfaces polished. That the silicon had been sinter-fused without fissures, pores or other gaps is illustrated by the photomicrographs reproduced as FIGS. 1 to 4. The interlocking has evidently been brought about by processes of diffusion and sintering between the silicon in the CMC substrate and the silicon preform.

After processing, the mirror structures are examined with respect to their resistance to thermal shock. In a hundred trials the structures were exposed to cyclic temperature fluctuations in the range 0–700 K, after which they were polished to reveal the internal structure. No fissures had formed in substrate or silicon, or at the interface between them.

A rod with the dimensions 50×4×4 mm was sawn out of the superficial part of a mirror structure and subjected to dilatometer measurement. In the temperature range 0–700 K the mirror material exhibited a thermal expansion coefficient of only $2.0 \times 10^{-6}$ K$^{-1}$.

EXAMPLE 3

A CFC cylindrical block is produced according to Example 1. After carbonization, graphitization and infiltration by chemical vapor deposition, the CFC cylinder is machined to the configuration shown in FIG. 6. A silicon wafer with a wall thickness of 0.8 mm is glued to the highly porous CFC component by means of polysilane precursors supplied by the firm of Wacker. After the resin has dried and hardened in an argon atmosphere at 180° C., the component is heated further at a rate of 3 kelvin per minute until it reaches 1200° C., so that the polysilane precursors are pyrolyzed.

The CFC structure is then put into a vacuum furnace, within a graphite crucible filled with pulverized metallic silicon. At a heating rate of 20 K per minute the system is brought to 1400° C., and after 30 minutes at that temperature it is cooled to room temperature. Due to doping, the silicon melts at only about 1350° C. and diffuses into the porous CFC matrix as far as the substrate-wafer interface, bringing about a so-called reactive fixation of the silicon wafer to the composite. Inspection of the structure in a polished section shows that some of the infiltrated silicon has combined with pyrolytic carbon to form silicon carbide and that the content of unbound silicon in the component is 21%. The silicon wafer has no pores, fissures or other gaps and is joined to the CMC composite in a firmly interlocking manner. This optically reflecting structure, with a density of 1.7 g/cm$^3$, is polished briefly with a lapping machine to reduce the surface roughness to the required level.

In this method in accordance with the invention it is especially advantageous that the conversion to CMC and the reactive fixation or joining of the silicon wafer to the CFC blanks both occur in situ, thus forming highly reflective mirror structures.

EXAMPLE 4

A commercially available honeycomb material made of hard paper, with a relative weight of 0.2 g/cm$^3$ and a cell (inscribed circle) diameter of 6 mm is impregnated with a phenolic-resin binder and dried at 70° C.

To each face of a disk of the resulting honeycomb structure, measuring 400 mm in diameter and 10 mm in thickness, three layers of carbon-fiber web prepregs are now pressed on or laminated in a heatable press at 200° C.

The resulting CFC structure is carbonized by heating to 1000° C. in the absence of oxygen, with a heating rate of 2 kelvin per minute. After a holding time of 6 hours the structure is cooled to room temperature, producing a carbon-based honeycomb structure which, apart from a linear shrinkage of ca. 17%, corresponds to the original CFC component. The still-porous honeycomb structure is further strengthened by infiltration with pyrolytic carbon, performed by chemical vapor deposition as described in Examples 1 and 3. The component so obtained, with a relative weight of 0.22 g/cm$^3$, has 4-point bending strengths of more than 150 N/mm$^2$.

One of the faces laminated with carbon-fiber web is superficially polished and two silicon wafers are glued to it. The resin binder used is a mixture of phenolic resin and silicon powder in the proportions 2:1 by weight.

Figure 7:
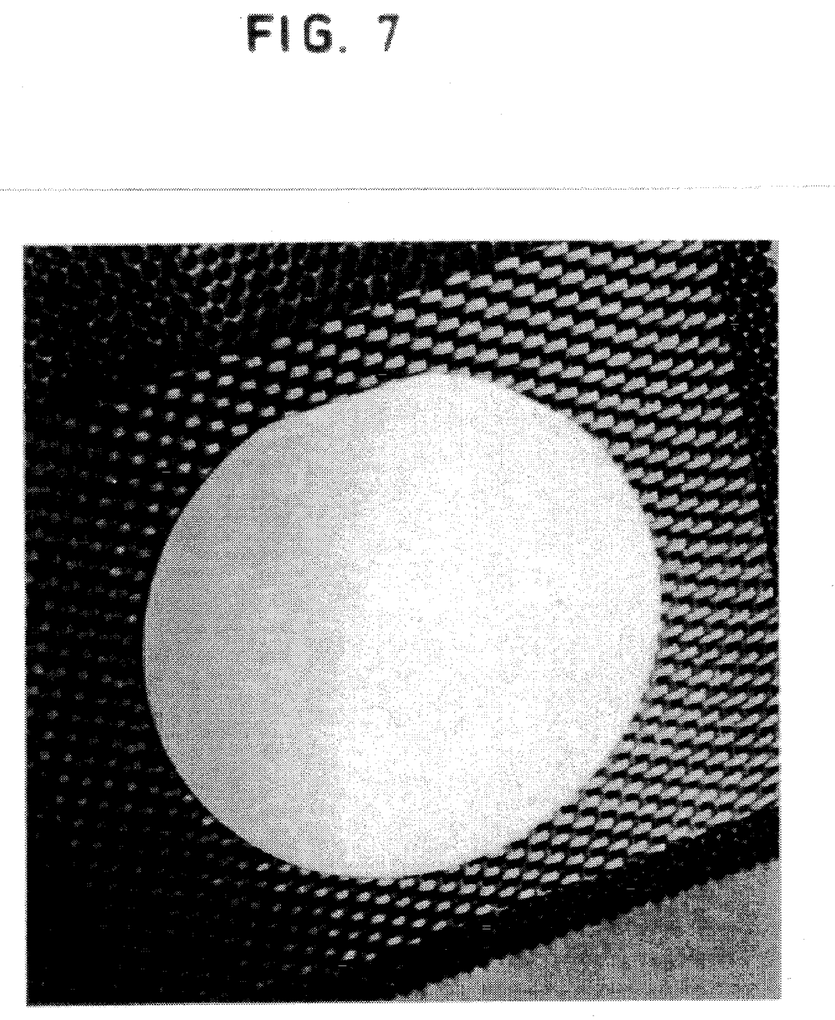
FIG. 7 shows a silicon wafer fixed to a honeycomb structure enclosed in carbon-fiber web.
Figure 8A:
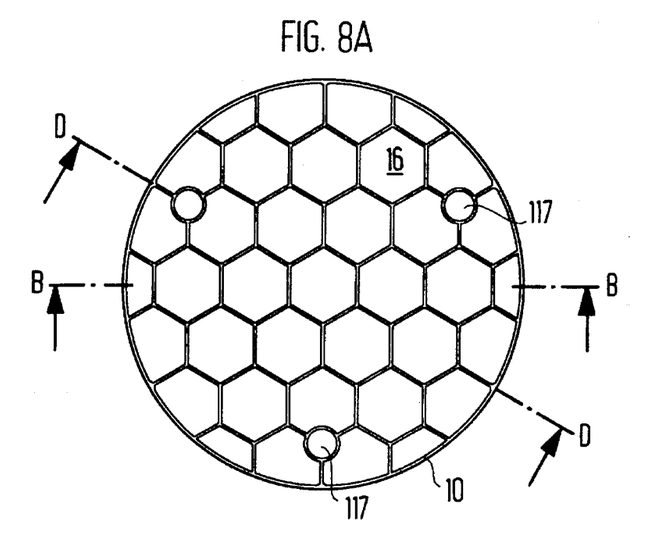
FIGS. 8A to 8D show different aspects of a preferred embodiment of an infrared telescope mirror.
Figure 8B:
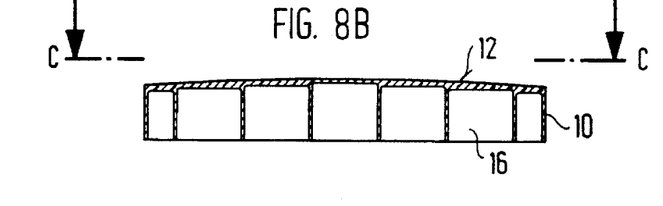
Figures 8C, 8D:
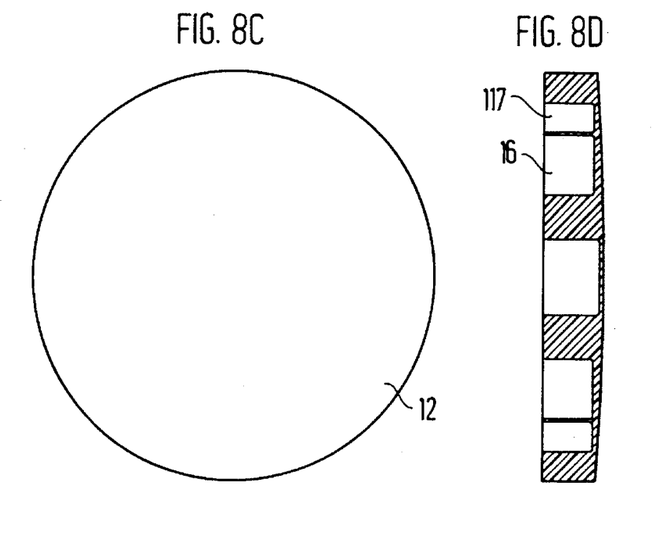

This procedure is followed by silicon infiltration as described in Example 3, whereby the wafer is fixed to the honeycomb structure. The honeycomb-based mirror structure obtained after cooling, with a real weight per unit volume of 0.42 g/cm$^3$, is shown in FIG. 7.

The resulting extremely light construction material is distinguished not only by its great rigidity and compression strength but also by low thermal conductivity. It is also particularly advantageous that the inner flexible honeycomb structures compensate for the expansion caused by thermal shock because of their thin walls, so that thermally induced fissures are kept to a minimum.

Figure 1:
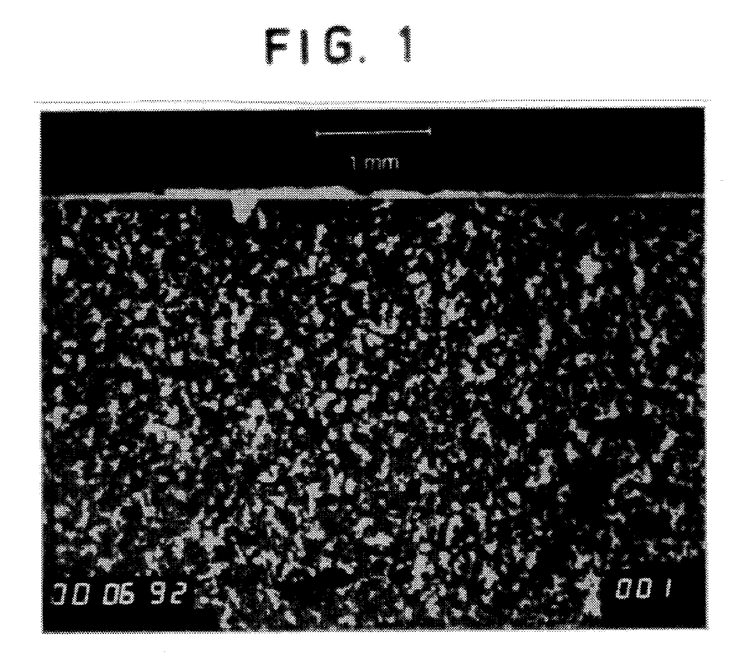
FIG. 1 shows a cross-section of a polished silicon wafer fixed to a CMC substrate at 20-fold magnification.
Figure 2:
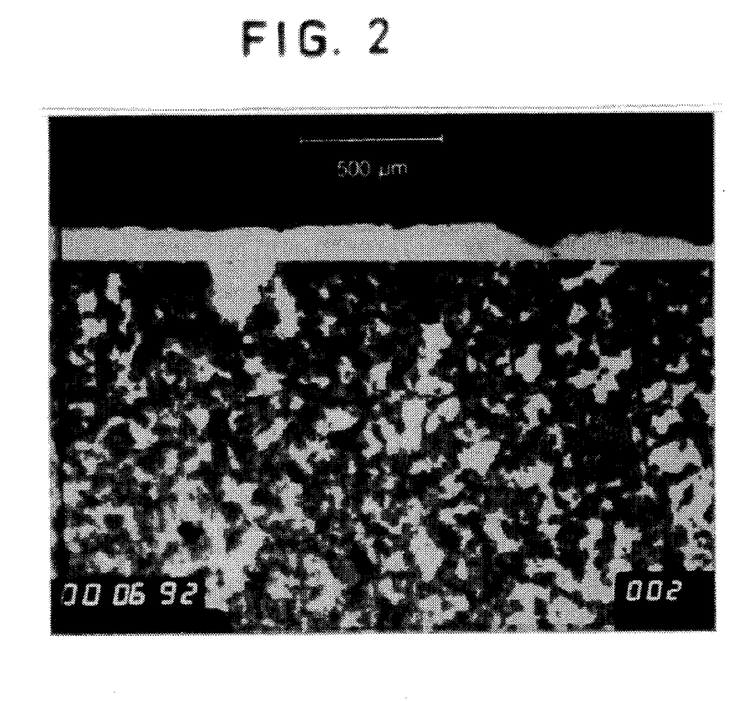
FIG. 2 shows the cross-section of FIG. 1 at 40-fold magnification.
Figure 3:
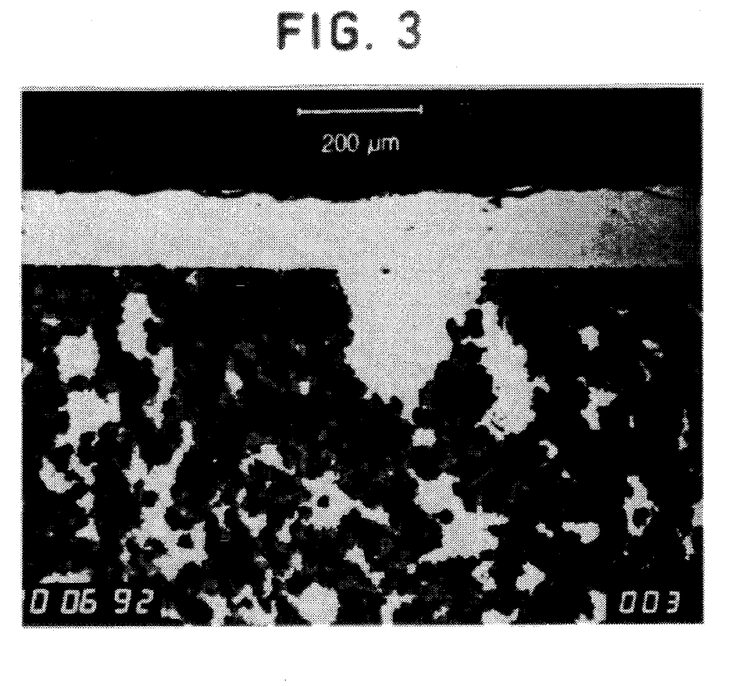
FIG. 3 shows the cross-section of FIG. 1 at 100-fold magnification.
Figure 4:
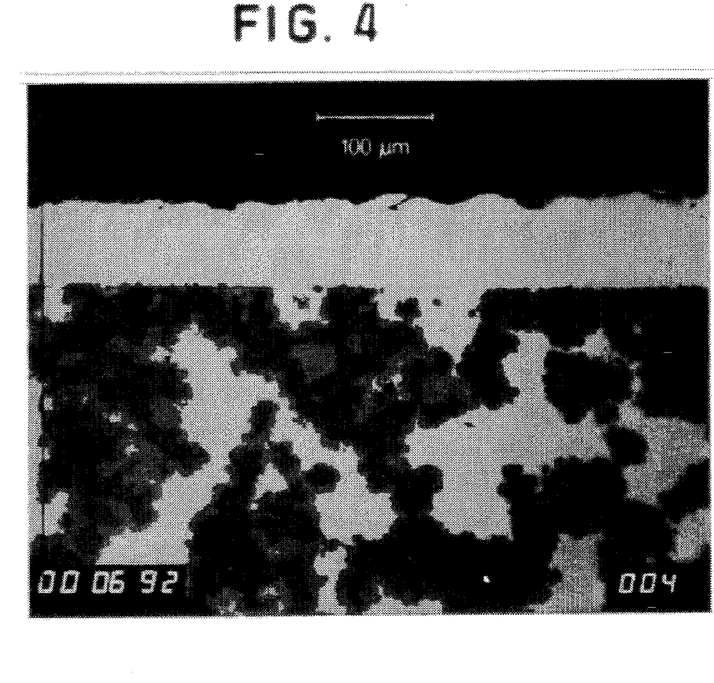
FIG. 4 shows the cross-section of FIG. 1 at 200-fold magnification.
Figure 5A:
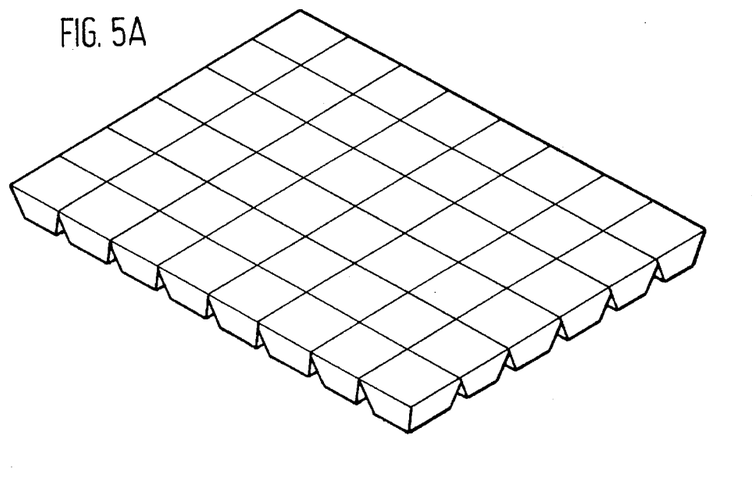
FIG. 5A is a perspective view of a large mirror composed of facets.
Figure 5B:
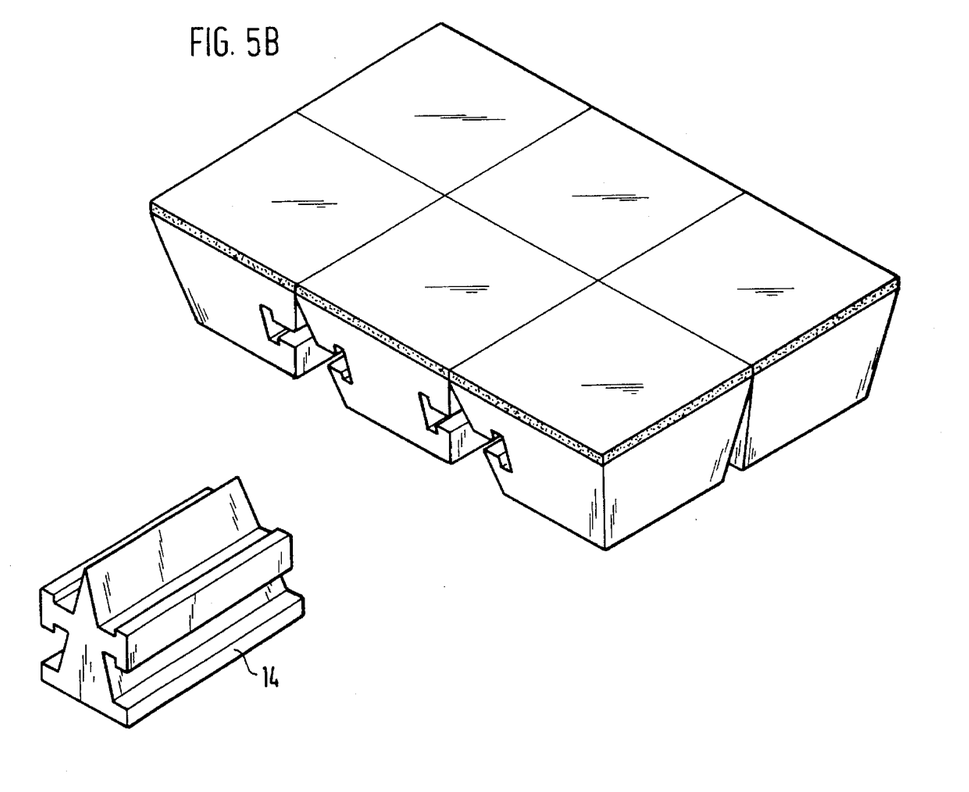
FIG. 5B is a perspective view to an enlarged scale of a section through part of the mirror shown in FIG. 5A.

FIG. 5 shows how a large-area mirror can be put together from subunits. Here it is especially advantageous that basic elements consisting of silicon wafers 11 and substrate structures 10 of matching dimensions can be combined to produce mirrors of any desired size. The substrate structures 10 are held together by bridging units 14 (preferably of CFC material). If the presence of gaps between the individual elements is permissible, the mirror can be constructed of ready-made single reflectors. It is also possible, of course, to join the "blanks" to one another and subject them all together to the procedure described above, so that all the parts are integrated together.

Figure 5C:
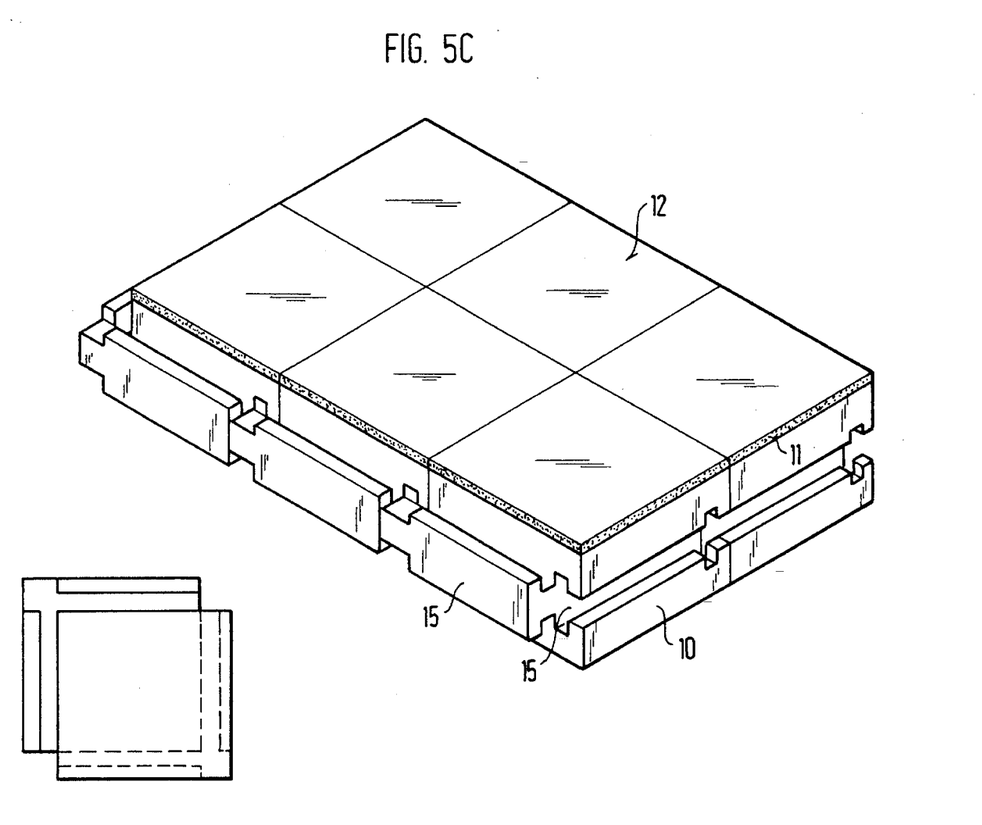
FIG. 5C is a view similar to that of FIG. 5B but of another embodiment of mirror.

In the embodiment shown in FIG. 5C, no bridging units 14 are necessary because the substrate structures 10 are so constructed as to form tongue-and-groove joints 15.

In the embodiment of the invention shown in the FIGS. 8A to 8D, the CMC component forming the substrate structure 10 is provided with honeycomb-like recesses. Furthermore, in this sample embodiment three mounting recesses 117 are also included, into which connection pins or the like can be fixed to mount the finished mirror. The other reference numbers for this embodiment of the invention apply to the same parts as previously or to parts with the same function. Manufacture can be carried out as described above.

Another version of the method of the invention will now be described with reference to FIGS. 9 and 10.

Figure 9A:
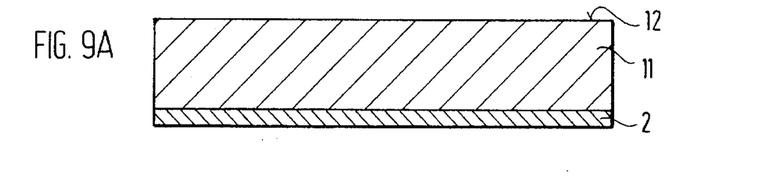
FIGS. 9A to 9C show steps in the production of another preferred embodiment.

As shown in FIG. 9A, the first step here is to coat a preform 11 of metallic silicon (a wafer) on the side opposite the reflecting surface 12 with a nonferrous metal, in particular with gold. This coating can be achieved by applying gold foil or by sputtering. The element so produced is shown in FIG. 9A.

This element is now heat-treated so that the gold layer 2 forms a melt eutectic with the silicon 11. This eutectic is indicated by the number 3 in FIG. 9B.

Figure 9B:
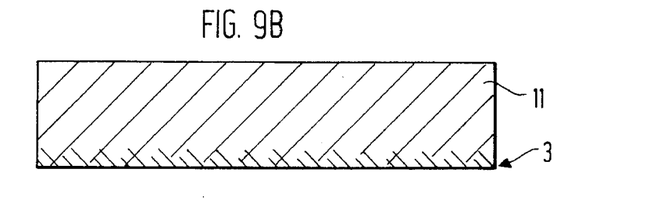
Figure 9C:
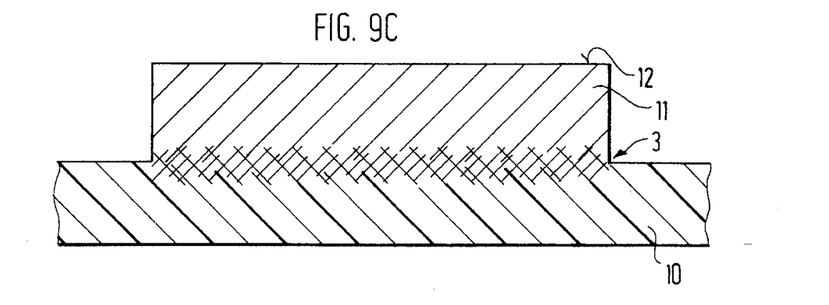

The element thus produced, shown in FIG. 9B, is now attached to the substrate structure 10, and then the whole apparatus is subjected to further heat treatment in a temperature range between 300° and 600° C. As a result, the upper (in FIG. 9C) silicon preform 11 becomes intimately joined to the lower substrate structure 10 over the whole region of the melt eutectic 3.

Figure 10A:
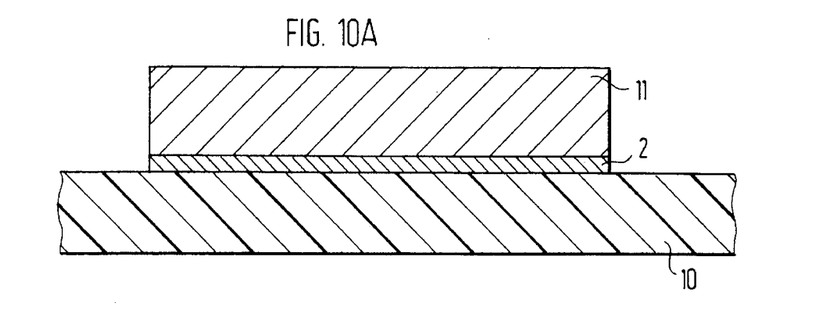
FIGS. 10A and 10B show steps in the production of a further embodiment similar to that shown in FIGS. 9A to 9C.
Figure 10B:
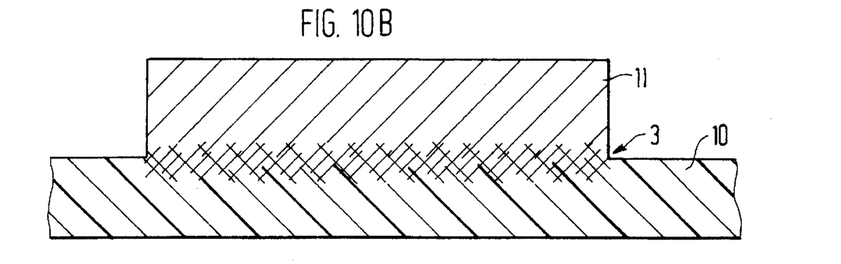

It is also possible to avoid a separate processing step for forming the melt eutectic on one surface of the wafer 11 (as in FIG. 9), by applying a wafer 11 directly to the substrate structure 10 with an intervening gold layer 2 (FIG. 10A). Then, in a single step, the two elements 10 and 11 are joined to one another by formation of a zone 3 of melt eutectic, as shown in FIG. 10B.

In this version of the method, the connection between the silicon preform (the wafer) and the substrate structure can be made at temperatures between about 300° and 600° C., whereas in the other versions of the method in accordance with the invention described above, the process temperatures are between ca. 900° and 1500° C. Furthermore, especially when gold is used as the nonferrous metal, it is possible to operate in a normal atmosphere and/or at normal pressure.

It will be appreciated that in the above description various steps of the method can readily be combined with one another.

What is claimed is:

1. A method for the production of a reflector or a mirror for the reflection of electromagnetic waves, comprising the steps of:

producing a preform from a material resistant to high temperatures to define a substrate structure for the reflector or mirror, applying an outer layer of metallic silicon to at least one surface of the substrate structure and bonding to said surface by a heat treatment to define a surface capable of reflecting electromagnetic waves in a defined direction, and wherein the metallic silicon is applied to the substrate surface in several layers, the layers being differently doped and that with the greatest doping being applied as the layer next to the substrate surface.

2. A method as claimed in claim 1, wherein an additional layer of silicon is applied as the uppermost layer.

3. A method for the production of a reflector or a mirror for the reflection of electromagnetic waves, comprising the steps of:

producing a preform from a material resistant to high temperatures to define a substrate structure for the reflector or mirror, applying an outer layer of metallic silicon to at least one surface of the substrate structure and bonding to said surface by a heat treatment to define a surface capable of reflecting electromagnetic waves in a defined direction, and wherein said outer layer of metallic silicon comprises silicon preforms adhered to the substrate preform, and comprising the additional step of placing said substrate preform and attached silicon preforms in a bath of doped low-melting-point silicon with the side opposite that which will form the reflective surface downwards so that doped silicon rises by capillary action through the substrate preform up to the level of the silicon preforms and makes connection with the back side of the silicon preforms.

4. A method as claimed in claim 3, wherein a plurality of substrate preforms and attached silicon preforms are mechanically arranged into a structure which is then consolidated into a unit in the bath by the ascending silicon.

5. A method as claimed in claim 3, wherein the substrate preform comprises a carbon material or a carbon-containing material which has been carbonized or graphitized.

6. A method for the production of a reflector or a mirror for the reflection of electromagnetic waves, comprising the steps of:

producing a preform from a material resistant to high temperatures to define a substrate structure for the reflector or mirror, applying an outer layer of metallic silicon to at least one surface of the substrate structure and bonding to said surface by a heat treatment to define a surface capable of reflecting electromagnetic waves in a defined direction, and introducing pyrolytic carbon into the substrate preform by chemical vapor deposition.

7. A method for the production of a reflector or a mirror for the reflection of electromagnetic waves, comprising the steps of:

producing a preform from a material resistant to high temperatures to define a substrate structure for the reflector or mirror, applying an outer layer of metallic silicon to at least one surface of the substrate structure and bonding to said surface by a heat treatment to define a surface capable of reflecting electromagnetic waves in a defined direction, carbidizing the reflecting silicon surface in an atmosphere containing hydrocarbons at a temperature above 700° C., and wherein the substrate preform contains between 5% and 50% inclusive by weight unconverted metallic silicon.

8. A method for the production of a reflector or a mirror for the reflection of electromagnetic waves, comprising the steps of:

producing a preform from a material resistant to high temperatures to define a substrate structure for the reflector or mirror, applying an outer layer of metallic silicon to at least one surface of the substrate structure and bonding to said surface by a melting-on heat treatment to define a surface capable of reflecting electromagnetic waves in a defined direction, and wherein prior to being melted onto the substrate preform, the metallic silicon is coated on its melting-on surface with a nonferrous metal that forms a melt eutectic with silicon.

9. A method as claimed in claim 8, wherein said nonferrous metal is gold and said melt eutectic is produced by heat treatment at a temperature between 300° C. and 600° C.

10. A method as claimed in claim 9, wherein the gold-coated metallic silicon is melted onto the substrate preform in an ambient atmosphere.

11. A method as claimed in claim 9, wherein the metallic silicon is coated with gold by the application of gold foil thereto.

12. A method as claimed in claim 9, wherein the metallic silicon is coated with gold by vapor deposition.

13. A method as claimed in claim 8, wherein said nonferrous metal is applied to the substrate preform.

14. A method as claimed in claim 8, wherein the coated metallic silicon is melted onto the substrate preform at temperatures in a range from 300° C. to 600° C.

15. A method as claimed in claim 8, wherein the melt eutectic of metallic silicon with a nonferrous metal is produced in a separate heating process, which is independent of the process of melting onto the substrate structure.

16. A method as claimed in claim 8, wherein the melt eutectic of metallic silicon with a nonferrous metal is produced in a single heating process simultaneously with the melting-on heat treatment used for applying the metallic silicon to the substrate preform.

17. A method as claimed in claim 8, wherein the steps of eutectic formation and of melting-on are carried out in a vacuum or in a protective atmosphere to prevent formation of an oxide layer by the nonferrous metal.

* * * * *